Patented July 7, 1953

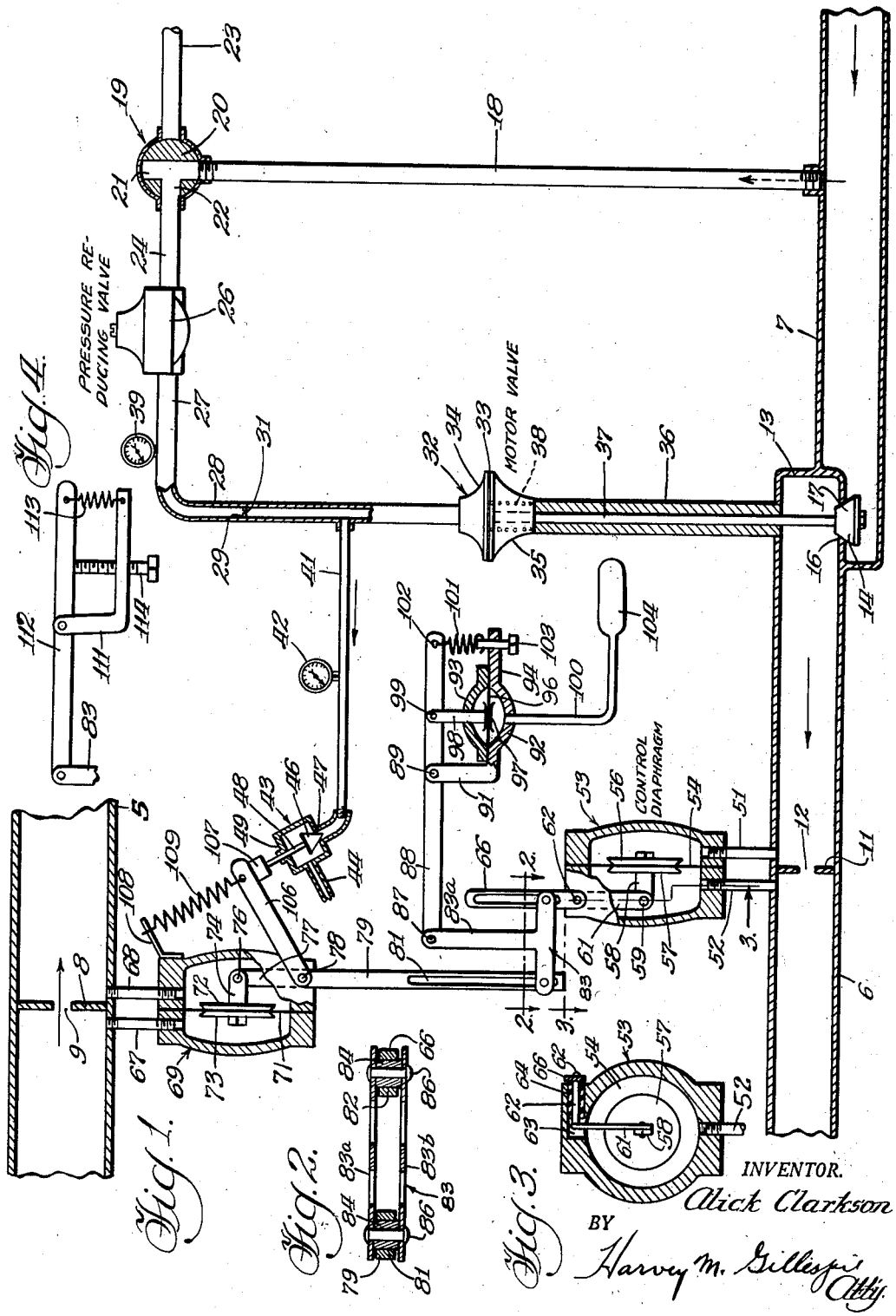

2,644,641

UNITED STATES PATENT OFFICE 2,644,641

PROPORTIONING CONTROL SYSTEM

Alick Clarkson, Itasca, Ill., assignor of one-half to Vapor Heating Corporation, Chicago, Ill., a corporation of Delaware Application June 1, 1950, Serial No. 165,428

9 Claims. (Cl. 236—23)

This invention relates to improvements in boiler control systems.

In the normal operation of the boilers of steam generators conditions usually arise which vary the demand for steam. As the demand for steam is increased, the supply of feed water must be correspondingly increased, as also the delivery of fuel to the heating apparatus, in order to prevent a drop in pressure and the quality of the steam. Conversely, as the demand for steam is decreased the supply of feed water must be correspondingly decreased with a decrease in delivery of fuel, otherwise the quality of the steam will be lowered during periods of reduced consumption when less fuel is required. It will thus be apparent that it is highly desirable and especially in a water tube boiler to automatically maintain a proportional balance between the delivery of feed water to the boiler, the delivery of fuel to the heating apparatus, and the discharge of steam.

The invention includes the use of conduits provided with orifice fittings and therefore, broadly considered, takes into account the physical laws governing the flow of fluids through metered orifices and utilizes the associated physical phenomena to automatically proportionally control the flow of one or more fluids, for example, the delivery of fuel to a boiler heating apparatus in relation to the delivery of feed water to the boiler. In carrying out my invention I employ a restricting orifice in the pipe line for delivering feed water into a boiler and also in a pipe line for delivering fluid fuel to the apparatus for heating the boiler. The pressure differential on opposite sides of the orifice fittings is utilized to operate means for controlling the delivery of said fuel in relation to the delivery of feed water. In this way I am enabled to accurately control the steam generating or fluid heating function of a boiler by energizing controls at the intake end of the boiler rather than from the discharge end. While it may be possible to use similar means for proportionately controlling the delivery of feed water and the delivery of fuel in relation to the outflow of steam or hot water from the boiler, I prefer controlling the output in relation to the intake. This is particularly true in connection with boilers of the water tube type, since the control of the intake and fuel minimizes variations in the quality of steam discharged from the boiler. In order to further increase the accuracy of my control system, I have provided means which is responsive to the temperature of the steam and/or other fluids discharged from the boiler. The said temperature responsive means is interconnected with the pressure controlled means and operable concurrently therewith, to adjust the relative positions of the associated proportional mechanism to take into account the temperature of the fluid discharged. Also as a further alternative to the temperature responsive adjustment, similar means are shown, whereby manual adjustments may be readily and conveniently made.

The proportional control herein shown can obviously be extended to proportionately control the flow of fluid streams in other situations. Therefore the broad aspect of the invention includes all alternative uses.

A principal object of my invention is to provide an improved proportioning control system embodying flow restricting orifices in the conduits of the system, whereby the physical phenomena associated with such structure may be utilized to automatically control the flow of one fluid stream in relation to another and which is particularly suitable for automatically controlling the operations of boilers of the water coil type, whereby the delivery of fluid fuel to a boiler heating apparatus is maintained in balanced relation to the volume of make-up water delivered into the boiler.

A further object of my invention is the provision, in a proportioning control system of the type described, of means for readily varying the proportions of fluids flowing in separate conduits.

A still further object of my invention is the provision, in a proportioning control system of the above character, of temperature responsive means for automatically adjusting the proportioning means so as to take into account the temperature or quality of the fluid discharged from the boiler.

Other and further objects and advantages of my invention will become apparent from the following description when considered in connection with the accompanying drawings in which:

Fig. 1 is a longitudinal sectional view, partly in elevation, of a proportioning control system embodying the present invention, the conduits for conducting the proportionately controlled fluid streams being shown fragmentarily.

Fig. 2 is an enlarged transverse section taken on line 2—2 of Fig. 1 to illustrate an approved manner of adjustably connecting certain of the parts together.

Fig. 3 is a longitudinal sectional view taken substantially on line 3—3 of Fig. 1, and Fig. 4 is an elevational view showing a modified arrangement for manually adjusting the operating levers illustrated in Fig. 1.

Referring to the drawings, there is diagrammatically illustrated an embodiment of my invention as applied to the control of fluid fuel delivered to the heating apparatus of a boiler or steam generator. In the present illustrative embodiment, the conduit or pipe 5 may be regarded as connected to a steam generator, not shown, and serves to conduct make-up water into the said boiler. A conduit 6 is connected to a fluid fuel burner (not shown) for heating the boiler, for delivering thereto, the fuel flow being automatically controlled in amount, when passing from conduit 7 into conduit 6, in a predetermined proportion to the volume of make-up water delivered into the boiler through conduit 5, as will be hereinafter described.

Suitably mounted within the conduit 5 is an orifice fitting shown diagrammatically as a plate 8 having an orifice 9 for restricting the flow of fluid therethrough. A similar orifice fitting 11 is shown diagrammatically as mounted within the conduit 6, the said fitting having an orifice 12. As seen in Fig. 1, conduits 6 and 7 are arranged in offset relation to each other with their ends closed, as at 13 and 14 respectively. the said conduits, however, communicate with each other through a valve port 16 which is closed by a valve 17, the said valve being operable, as hereinafter described, to permit the passage of fluid fuel from conduit 7 into conduit 6 leading to the heating apparatus of the steam generator. While for convenience the apparatus in Fig. 1 is illustrated as occupying a vertical position and the fluids in conduits 5 and 6 as flowing in opposite directions these conditions may be varied in accordance with the requirements in various installations. Communicating with the interior of conduit 7 is a pipe 18 which is connected to port opening of a three-way valve, indicated generally by the numeral 19, the core 20 of the said valve being formed with a diametrical passage 21 and a radial passage 22 connecting therewith. Communicating with another port opening in the valve 19 is a pipe 23 which functions as a drain in the present installations and as an air pressure pipe in others. Communicating with an oppositely disposed port in the valve 19 is a pipe 24, the said pipe being in axial alignment with pipe 23. As will be understood rotation of the valve core 20 will provide various combinations of connections between conduits 18, 23 and 24, as desired.

Pipe 24 is provided with a pressure reducing valve 26 of conventional construction. Connected to the said valve 26 is a pipe 27 having a downturned portion 28 in which is suitably interposed an orifice fitting 29, the said fitting being formed with an orifice 31. The pipe portion 28 leads into and is connected with a pressure motor, indicated generally by the numeral 32, the said pressure motor being employed to actuate the valve 17. The pressure motor 32 is of conventional construction and includes a diaphragm 33 clamped between housing sections 34 and 35, the section 35 being supported on a tubular member 36 which encloses the valve stem 37 connected with valve 17. The valve stem 37 is fixed to the diaphragm 33 to move upwardly or downwardly therewith as the fluid pressure acting on the upward face of the diaphragm changes. A coil spring 38 is positioned below the diaphragm 33 to substantially counterbalance the weight of the parts in order to give the desired action to valve 17, under fluid pressure changes above the diaphragm 33. A fluid pressure gauge 39 is connected into pipe 27 to indicate the pressures therein.

Connected into pipe 28, at a point below the orifice plate 29, is a pipe 41 having connected therein a pressure gauge 42 and being connected, at its outer end, with a pressure operated valve in the form of a bleed valve indicated generally by the numeral 43, the said bleed valve having a conduit 44 connected thereto to conduct away any excess fluid bled from pipe 41 when the valve 46 is moved away from its valve seat 47. The valve 46 is mounted on the end of a valve stem 48 which is slideable in the end plate 49 of the bleed valve 43. The valve 46 is adapted to control the pressure in the pressure chamber of the motor valve 32 for actuating valve 17. When the valve 46 is caused to open slightly to bleed fluid out of pipe 41, the pressure in the pressure chamber of the motor valve 32 is reduced and, consequently, the valve 17 is moved by spring 38 toward its closed position, as seen in Fig. 1, thereby to reduce the volume of fuel delivered from conduit 7 into conduit 6. When the valve 46 closes, the pressure in the pressure chamber of motor valve 32 increases and therefore acts upon the diaphragm 33 to impart an opening movement to the valve 17 through the valve stem 37 to increase the delivery of fuel to the heater or steam generator.

Valve 46 is opened and closed in response to changes in the pressure differential of the make-up water and the fluid fuel in conduits 5 and 6, respectively, on opposite sides of their respective orifice plates 8 and 11, the pressure differential being transmitted to the valve 46 through the following mechanism: Connected to conduit 6 by smaller pipes 51 and 52 is a diaphragm casing, indicated generally by the numeral 53, the said casing being formed of two sections between which is suitably clamped, around its marginal edges, a flexible diaphragm 54, the said diaphragm having clamps on the central portion of its two faces supporting plates or discs 56 and 57, from the left hand side of which, as viewed in Fig. 1, extends a short arm 58 adapted to move with the diaphragm 54. It is noted that the pipe 51 connects at one end into the interior of conduit 6, on the high pressure side of the orifice plate 11, and, at its other end, with the space within the casing 53 on the right side of diaphragm 54, while the pipe 52 connects, at one end, with the interior of conduit 6, on the low pressure side of the orifice plate 11, and, at its other end, with the space on the left hand side of the diaphragm 54. The direction of flow of fluid within the conduit 6 is as indicated by the arrows.

Pivotally connected, as at 59, within the diaphragm casing 53 is an arm 61 to which, at its outer end, is fixed a shaft 62 so that movement of arm 61 about the axis of shaft 62 will effect a slight rotation of the said shaft. As seen more clearly in Fig. 3, the upper interior wall of the diaphragm casing 53 is provided with a recess 63 to receive the end of arm 61 adjacent the end of shaft 62, this provides clearance for movement of arm 61 as the diaphragm 54 moves. The hole through which the shaft 62 extends is larger in diameter than the said shaft, and within the intervening space, is mounted a bearing sleeve 64 of suitable rubber or plastic material which is molded to the shaft, but is sufficiently yieldable to permit the shaft 62 to move in response to all movements of the diaphragm 54 and yet prevent any leakage there along of fluid pressure from the interior to the exterior of the casing. Fixed to the outer end of the shaft 62 to rotate therewith and disposed outside of the casing 53 is the lower end of an upwardly extending arm 66, which as will be understood in Fig. 1, will swing to the right or left as the diaphragm 54 moves.

Connected to conduit 5 by pipes 67 and 68 is another diaphragm casing, indicated generally by the numeral 69, the said casing is similar in construction to diaphragm casing 53 and is likewise formed of two sections between which is suitably clamped a diaphragm 71, the said diaphragm having clamped on the central portion of its two opposed faces supporting plates or discs 72 and 73 from the right hand side of which, as viewed in Fig. 1, extends an arm 74 for movement with the diaphragm 71. Pivotally connected to the arm 74, as at 76, and within the casing 69 is an arm 77 which is fixed to shaft 78 extending through the wall of the casing, the said shaft being provided with a sleeve similar to the sleeve 64, illustrated in Fig. 3. Fixed to the outer end of shaft 78 to rotate therewith and positioned exteriorly of the casing 69 is the upper end of a downwardly extending arm 79 which, as will be understood in Fig. 1, will swing to the left or right as the diaphragm 71 moves. As will be seen by reference to Fig. 1, pipe 67 connects the space in the casing 69 to the left of the diaphragm 71 with the high pressure side of the orifice plate 8, while pipe 68 connects the space within the casing 69 to the right of the diaphragm 71 with the low pressure side of the orifice plate 8. It will be seen therefore that the high pressure chamber at the left of diaphragm 71 is opposed to the high pressure chamber at the right of diaphragm 54.

The diaphragm casings 53 and 69 are substantially similar in construction, except that the arm 79 is longer than arm 66. The relative lengths of arms 79 and 66, however, may be changed as desired to meet the requirements of various operating conditions. Arm 79 for any desired portion of its length is provided with a longitudinally extending central slot 81 which extends to near the bottom end of the arm or may open through the bottom end if desired. Arm 66 is similarly provided for any desired portion of its length with a slot 82. Arms 79 and 66 are pivotally connected together by an inverted T-shaped link member, indicated generally by the numeral 83. The position of the T-shaped connection is established at the time of the installation to provide the desired proportions of lever 79 and 66. Suitable adjustments of the lever proportions may be made automatically to compensate for variations in the pressure and quality of the steam or similar adjustments may be made manually. The member 83 comprising two identically shaped elements 83a and 83b spaced by spacers 84, the said spacers being received within the slots 81 and 82. The elements 83a and 83b are held securely against the spacers by suitable fasteners 86. Sufficient clearance is provided between the spacers 84 and the marginal edges of the slots 81 and 82 to permit longitudinal sliding movement, as also the slight pivotal movement required between the parts when either of the diaphragms 54 or 71 moves.

Pivotally connected to the upper end of the upright portion of the member 83, as at 87, is a lever arm 88 fulcrumed, as at 89, on an extension 91 projecting from a temperature controlled diaphragm housing, indicated generally by the numeral 92. The said housing includes casing elements 93 and 94 between which is suitably secured a diaphragm 96, the said diaphragm being provided with plates or discs 97 centrally disposed and from which projects an arm 98, the said arm extends upwardly through an opening in casing section 93 and is pivotally connected, as at 99, to the lever arm 88. A tension spring 101 connects at one end with the free end of lever arm 88, as at 102, and at the other end to a spring tension adjusting screw 103.

Connected to a port opening in section 94 of the diaphragm casing, is a pipe 100 which connects at the other end to a thermal expansion element 104. The expansion element 104 contains suitable medium which is responsive to temperature changes, such that upon the element 104 being located in contact with the steam discharge conduit (not shown) or at other locations whereby it is subjected to a certain temperature, the medium contained in said element 104 will be partially or wholly converted to vapor within the element and thereby increase the pressure within the diaphragm casing below the diaphragm 96 to urge the same upwardly, effecting an upward movement of arm 98, the degree of upward movement varying with the pressure exerted against the diaphragm.

Also fixed to the outer end of shaft 78, outside of the casing 69, and adapted for rotation with the shaft 78 is an arm 106. As seen in Fig. 1, the arm 106 extends angularly upwardly to a position such that its head 107 is positioned over the valve stem 48 and is connected thereto to move therewith. A bracket 108 is mounted on the casing 69 and serves to secure one end of the tension spring 109, the other end of which is connected to the other end of the arm 106. The spring 109, thus normally, tends to urge the arm 106 in a counter-clockwise direction, as viewed in Fig. 1, except as prevented by diaphragm 71. Movement of the diaphragm 71 to the right, through arms 74 and 77 and shaft 78, would cause arm 106 to move in a clockwise direction and to close the bleed valve 46 against the tension of spring 109.

The manually operated control mechanism illustrated in Fig. 4 may be substituted for the lever 88 and the automatic adjusting means associated therewith in Fig. 1. It includes an L-shaped member 111 on the upright leg of which is pivoted a lever arm 112, the said arm 112 corresponds to arm 88 of Fig. 1 and is adapted for connection at one end to member 83. The other end of the arm 112 is provided with a spring 113 which is attached on the horizontal leg of the member 111 and is adapted to urge the arm 112 in a clockwise direction. A screw 114 bearing against the bottom side of the arm 112 serves to effect adjustment in the positioning of the arm 112 and to hold the same in an adjusted position, the lever arm 112 effecting movement of the member 83 to vary the proportions of the lever ratio of levers 79 and 66.

The operation of the present proportioning control system is as follows:

Assuming that the inflow of water through conduit 5 is in the direction of the arrow or to the right as viewed in Fig. 1, and the flow of fluid fuel, for example gas or oil through the conduits 6 and 7 is in the direction of the arrow or to the left, because of the orifice plate 8 in conduit 5, there is a loss in pressure head in the conduit from the upstream and downstream sides of the orifice plate 8. As a result, the pressure on the left hand side of the orifice plate 8 is greater than that on the right hand side. Correspondingly, the pressure on the right hand side of the orifice plate 11 in conduit 6 will be greater than the pressure of the left hand side thereof. It is thus seen that the pipes 51 and 67 lead the higher pressures to their respective sides of the diaphragms 54 and 71, and the pipes 52 and 68 lead the lower pressures to the respective sides of these diaphragms. Accordingly, the effective pressure on each of the diaphragms 54 and 71 will be the differential between the pressure on the two sides of the orifice plates 11 and 8.

Assuming a condition in which there is a flow of water in conduit 5 corresponding to a demand for steam, the diaphragm 71 will be flexed to the right, as viewed in Fig. 1, thereby effecting a swinging of the arms 79 and 106 in a clockwise direction. Arm 106 will thus close the bleed valve 46 which closing will result in a rise in the pressure in pipes 28 and 41 which pressure in turn will act on the diaphragm 33 of the valve motor 32 to flex the same downwardly to further open the valve 17 (which under the conditions assumed normally stands part way open) and admit a greater volume of fuel from conduit 7 (connected to any suitable fuel pressure supply at any desired pressure) into the conduit 6, thereby increasing the pressure in conduit 6 and correspondingly increasing the amount of fuel flowing through the orifice 12 to the fire chamber of the steam generator. As the pressure in conduit 6 increases, the pressure differential on opposite sides of the orifice plate 11 correspondingly increases, and it will finally reach a point where it is sufficient to flex diaphragm 54 to the left, as viewed in Fig. 1, and through the arms 58, 61, 66 and member 83 effect a counter-clockwise rotation of the arms 79 and 106 to open the bleed valve 46 and relieve some of the pressure in the pipe lines 41 and 28. This in turn will proportionately move valve 17 in a direction to close and, therefore, will admit less fuel into conduit 6, thus reducing the amount of fuel supplied to the steam generator. The automatic repetition of the operations above described will cause a flow of fuel to the heater of the boiler to be proportionate to the feed water flowing into the boiler.

The temperature control apparatus hereinabove described is responsive to variations in temperature at some convenient location on the boiler or on the outlet pipe for discharging steam or hot water from the boiler and functions concurrently with the pressure responsive apparatus to adjust the proportioning means in relation to the temperature of the steam or other fluid discharged from the boiler. As the temperature of the steam or hot water increases, the media contained within the thermal expansion element 104 is caused to vaporize, thereby effecting an increase in pressure within the element 104 and the pipe 11, the pressure acting on the diaphragm 96 to move the arm 98 upwardly and to rock the lever arm 88 in a counter-clockwise direction. The lever 88 at the connection 87 moves downwardly in an arc having the pivot 89 as its center and therefore acts on the member 83 to incline the same in a counter-clockwise direction, thereby to rock the arms 79 and 106 in a clockwise direction to increase the opening of the bleed valve 46 which results in reducing the pressure in the pipes 28 and 41. Thus, the valve 17 is caused to move toward its closing position to admit a reduced volume of fuel from conduit 7 into conduit 6, thereby reducing the amount of fuel flowing through conduit 6 to the fire chamber of the steam generator.

It will be apparent that the operation of the temperature control mechanism interacts with the pressure responsive mechanism with each operating concurrently to proportionately regulate the delivery of fuel in relation to the inflow of feed water. Thus, one control mechanism acts as a check against the other, thereby providing an added factor of safety in the operation of the steam generator.

While certain proportions and positioning of the parts have been shown in the drawings it is to be understood that this is only for illustrative purposes and that various adjustments may be made to meet the requirements of a particular installation. For example, the member 83 may be adjusted longitudinally of the arms 66 and 79 as desired to change the ratio of the movements of the respective levers. It is accordingly apparent that by suitable adjustment of the member 83 on the arms 66 and 79, the inflow of fuel may be proportioned with relation to the inflow of make-up water. It is also understood that any suitable means such as a pump, injector or other conventional means may be used as desired to force the incoming water through conduit 5 into the steam generator against the internal pressure therein so that the full pressure within the generator will not be exerted against the incoming water. As will be understood, it is the differential in pressure on the two sides of the orifice plate 8 in conduit 5 that is effective to cause movement of diaphragm 71, and the differential in pressure on the opposite sides of orifice plate 11 in conduit 6 that is effective to cause movement of diaphragm 54.

I claim:

1. A boiler control system for proportionately controlling the delivery of fluid fuel to the fire chamber of the boiler in relation to the delivery of feed water to the boiler comprising a conduit for delivering said fuel, a conduit for delivering said feed water, inter-connected pressure operated means responsive to variations in the flow of feed water through its conduit in relation to the flow of fuel through its conduit, a fluid pressure operated admission valve for controlling the delivery of fuel through the fuel conduit to the fire chamber of the boiler, and means actuated by said inter-connected pressure operated means for varying the fluid pressure for operating said fuel admission valve.

2. A boiler control system for proportionately controlling the delivery of fluid fuel to the heating apparatus for the boiler in relation to the delivery of feed water to the boiler comprising a conduit for delivering said fuel to the heating apparatus, a conduit for delivering feed water into the boiler, inter-connected pressure operated means responsive to variations in the flow of said feed water through its conduit in relation to the flow of fuel through the fuel delivery conduit and including a movable member responsive to the flow of said feed water through said feed water conduit, a movable member responsive to the flow of fuel through the fuel conduit, a set of proportioning levers connected one to each of said movable members and to each other, a fluid pressure operated admission valve for controlling the delivery of fuel to the fire chamber of the boiler, and means actuated by said inter-connected proportioning levers for varying the fluid pressure for operation of said fuel admission valve.

3. A boiler control system for proportionately controlling the delivery of fluid fuel to the fire chamber of a boiler in relation to the delivery of feed water to the boiler comprising a conduit for delivering said fuel, a conduit for delivering said feed water, inter-connected pressure operated means responsive to variations in the flow of feed water through its conduit in relation to the flow of fuel through the fuel delivery conduit and including a movable member responsive to the flow of feed water to the boiler, a movable member responsive to the flow of fuel, a set of proportioning levers connected one to each of said movable members and to each other, a fluid pressure operated admission valve for controlling the delivery of fuel, and a bleed valve actuated by said inter-connected proportioning levers for varying the fluid pressure for operating said fuel admission valve.

4. A boiler control system according to claim 3 in which each of said movable members is a flexible diaphragm.

5. A boiler control system according to claim 4 in which each conduit is provided with a flow restricting orifice fitting therein, and the spaces on the opposite sides of each of said diaphragms are connected to the inside of their respective conduit on opposite sides of the orifice fitting therein.

6. A boiler proportioning control system comprising a first conduit for delivering a stream of fluid into the generator, a second conduit for delivering another stream of fluid into the generator, an admission valve for increasing and decreasing the flow of fluid in one of said conduits, a movable member responsive to the movement of fluid in the first conduit, a movable member responsive to the temperature of the boiler, a movable member responsive to the fluid movement in the second conduit, proportioning levers connected to each of said movable members and to each other, and means operatively connected to one of said levers for controlling the position of said valve to regulate the flow of one of said streams proportionately to the flow of the other of said streams.

7. A proportioning control system for proportioning the flow of a stream of fluid into a steam generating apparatus with relation to the flow of a stream of fluid fuel thereto, comprising, a first conduit through which one of said streams is conducted under pressure, a second conduit through which the other of said streams is conducted under pressure, an admission valve for varying the supply of fluid to one of said conduits, a flow restricting orifice fitting in each of said conduits, a pair of diaphragm casings, one for each conduit, each casing having a flexible diaphragm therein with a space on each side of the diaphragm, each of said diaphragm casings being connected with its respective conduit with a pair of passage ways, one leading from one side of the orifice fitting to one side of the diaphragm, and the other from the other side of the orifice fitting to the other side of the diaphragm, each of said casings having an inside lever arm and an outside lever arm operated by the diaphragm, means connected with one of said diaphragms for controlling the position of said admission valve, means for automatically adjusting the relative proportions of said outside lever arms comprising a link adjustably connecting said outside lever arms together, a thermal expansion element associated and connected to a diaphragm casing having a flexible diaphragm therein, and means operatively connecting the last mentioned diaphragm with said link to vary its position between said outside lever arms.

8. A proportioning control system for proportioning the flow of a stream of fluid fuel into a steam generating apparatus with relation to the flow of feed water into said steam generating apparatus, comprising a first conduit through which one of said streams is conducted under pressure, a second conduit through which the other of said streams is conducted under pressure, an admission valve for varying the supply of fluid to said second conduit, a flow restricting orifice fitting in each of said conduits, a pair of diaphragm casings, one for each conduit, each casing having a flexible diaphragm therein with a space on each side of the diaphragm, each of said diaphragm casings being connected with its respective conduit with a pair of passage ways, one leading from one side of the orifice fitting to one side of the diaphragm, and the other from the other side of the orifice fitting to the other side of the diaphragm, each of said casings having an inside lever arm and an outside lever arm operated by the diaphragm, means connected with one of said diaphragms for controlling the position of said admission valve, means for automatically adjusting the relative proportions of said outside lever arms comprising a link adjustably connecting said outside lever arms together, a thermal expansion element connected to a diaphragm casing having a flexible diaphragm therein, lever means for connecting the last mentioned diaphragm with said link, and manual means for adjusting the position of the last mentioned lever to vary the position of said link relative to said outside lever arms.

9. A boiler proportioning control system for proportioning the flow of fluid fuel to the fire chamber of the boiler with relation to the delivery of feed water to the boiler, comprising a first pipe through which said feed water is delivered to the boiler, a second pipe through which the fuel is delivered to the fire chamber, an orifice wall in each of said pipes and having a restricted orifice therethrough, a diaphragm casing associated with each of said pipes, each of said casings having a diaphragm dividing the interior thereof into two spaces, a passageway connecting one of said spaces with the interior of the associated pipe on one side of its orifice wall and a passageway connecting the other one of said spaces with the interior of the associated pipe on the other side of its orifice wall, a shaft rotatably mounted in each of said casings and extending from the inside to the outside thereof, an inside lever arm in each of said casings connected at one end with a diaphragm and fixed at its other end to rotate said shaft, an outside lever arm on each of said casings and fixed to its shaft so that movement of each diaphragm will cause movement of its outside lever arm, a link inter-connecting said outside lever arms and movable lengthwise thereof to vary their effective leverage ratios, and a thermal expansion element responsive to the boiler temperature and operatively connected to said link to adjust its position relative to said outside levers.

ALICK CLARKSON.

References Cited in the file of this patent

UNITED STATES PATENTS

| Number | Name | Date |
|---|---|---|
| 1,721,800 | Wunsch | July 23, 1929 |
| 2,006,035 | Stewart | June 25, 1935 |
| 2,193,095 | Harrison | Mar. 12, 1940 |
| 2,196,316 | Long | Apr. 9, 1940 |
| 2,305,070 | Butler | Dec. 15, 1942 |